United States Patent Office
3,061,027
Patented Oct. 30, 1962

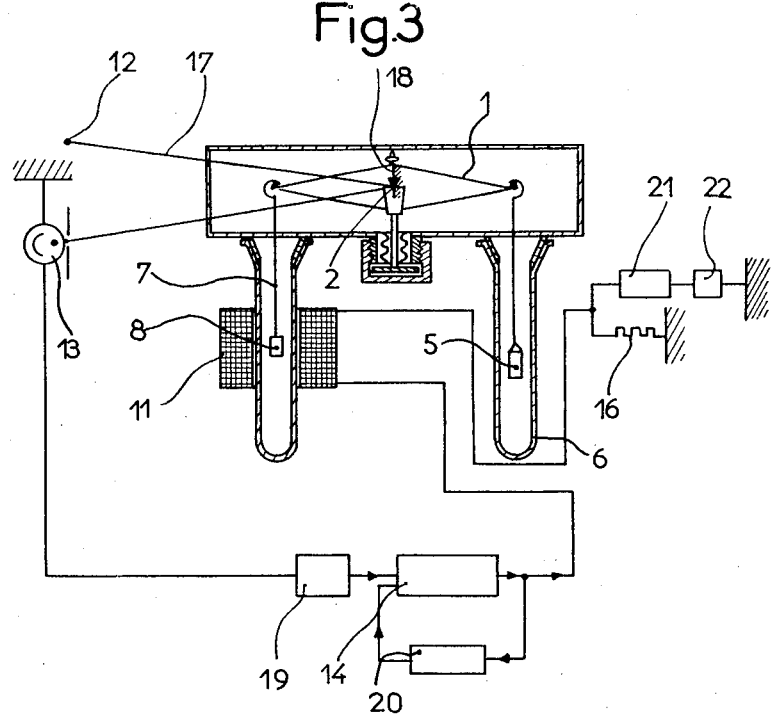
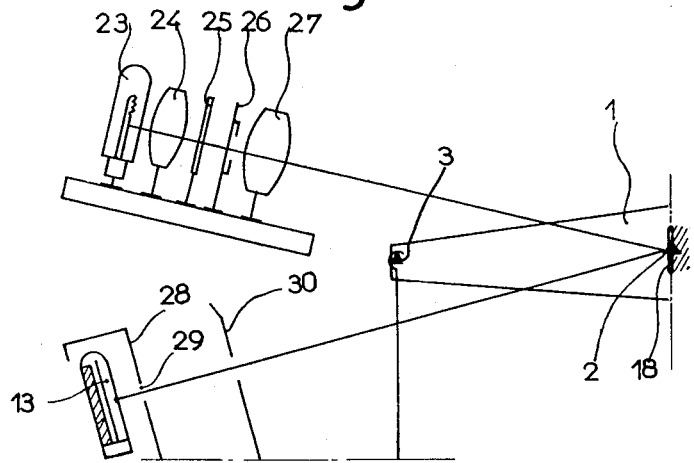

3,061,027
ELECTRICALLY-OPERATED REPOSITIONING SERVO-SYSTEMS RESPONSIVE TO A VARIABLE MAGNITUDE
Pierre Berge, Malakoff, and Max Tournarie, Massy-Verrieres, France, assignors to Commissariat a l'Energie Atomique, Paris, France, a corporation of France
Filed Mar. 2, 1959, Ser. No. 796,406
Claims priority, application France Mar. 10, 1958
9 Claims. (Cl. 177—194)

This invention relates to servo-systems responsive to a variable magnitude, and of that type wherein a variation in said magnitude causes a movable member to be displaced from an equilibrium position, such displacement in turn generating an electric signal which sets, through suitable motive means, to reposition the member to its equilibrium position while simultaneously actuating an output device to yield an output—e.g. an indication—which is a measure of the variation in the magnitude that was responsible for the displacement of the member from equilibrium. Systems of this kind can suitably be described as electrically-operated re-positioning servo-systems.

Such servo-systems are widely used in metrology for indicating and recording minute variations in some physical magnitude under investigation, and often assume the form of a precision balance wherein the displaceable member is a pivoted balance beam. While the invention, therefore, is of particular value in connection with presision measuring instruments of that kind, it is to be understood that the broader features of the invention are applicable to electrical re-positioning systems other than for measuring purposes, and with greater reason to re-positioning systems other than weighing balances, it being evident for example that the output device mentioned above may exert actions of regulation and/or control of the variable quantity, instead of or in addition to its indicating or recording functions.

Conveniently, the electric signal may be generated by optical means including a photo-electric cell which is variably illuminated in response to the displacement of the member; and furthermore, the electric motive means responsive to the signal for re-positioning the movable member to equilibrium may conveniently assume the form of an electromagnetic device including a magnetic core attached to the member and a surrounding solenoid to which the signal is applied. Again, however, these statements should not be construed as imposing restriction on the scope of the invention, since the electric signal may be produced by any suitable signal generator, not necessarily of the electro-optical type mentioned above; for example inductive, resistive or capacitive signal generating means, may be used. Similarly, the motive means responsive to the signal and acting to re-position the movable member may be other than of the solenoid-and-core type mentioned, e.g. a rotary electric motor.

For purposes of illustration and simplicity, the invention will be described in a single form of embodiment relating to a precision balance using photo-electric signal generating means and electromagnetic re-positioning means.

One form of such a precision weighing system is disclosed in U.S. Patent No. 2,754,109 and it is found convenient to disclose the present invention in the narrow aspect where its object is to provide improvements in the performance of this earlier system.

A system similar to that disclosed in the earlier U.S. patent is shown in FIGS. 1 and 2 of the accompanying drawings, which respectively are a schematic general view of the system, and a circuit diagram of the electrical part of it. Referring then to FIGS. 1 and 2, an electromagnetically compensated precision balance comprises a balance beam 1 pivoted about the usual knife-edge 2. Suspended from one end of the beam is a rod 4 shown as supporting a pan or carrier 5 for a weight to be measured, or the variations in which weight with time are to be recorded. A sealed enclosure 6 surrounds the weight to provide a controlled atmosphere therefor. Suspended from the other end of the balance beam 1 is a rod 7 which supports a magnetic core 8 and, through a link 9, a mask 10. Surrounding this assembly is another sealed enclosure and around this is a solenoid winding 11 which is adapted to generate a magnetic field parallel to the rod 7, in response to an electric signal applied to the solenoid through means presently to be described. The magnetic field from the solenoid will exert upon the core 8 a variable force which, as will presently appear, acts susbtantially at all times to compensate for the variable force exerted by the weight 5. Under such conditions, it will be apparent that the variations in current flowing through the solenoid 11 will represent the variations in the weight 5 to be measured.

To achieve this automatic re-positioning of the balance beam, there is provided a feedback chain which comprises a light source 12 and a photo-electric cell positioned on the other side of mask 10 from the source so as to be variably illuminated in response to beam displacement, and the variable output from the photo-cell 13 constitutes the electric signal which, after amplification, is applied to the solenoid 11 to produce the repositioning action. In series with the solenoid winding is a resistance 16 which provides a voltage drop serving to measure the instantaneous value of the current and hence the variations in weight. Thus, the operation of this system may be summarized as follows: on variation in the weight 5, the resulting unbalance of beam 1 modifies the vertical position of mask 10 and hence the illumination of cell 13 from source 12. The resulting signal generated by the cell is applied, through suitable electric network presently described, to solenoid 11 in such a sense that the resulting change in magnetic field will tend to displace the core 8 and hence the beam 1 in a direction to restore the beam to its equilibrium position. The voltage drop as measured across resistor 16 then is a measure of the variation in the weight 5 and such voltage variations can readily be recorded to provide a graph of the time variations of the weight. It will immediately be evident that this system can without further alteration be used to measure variable conditions other than weight, e.g. the pressure in the enclosure 6, or the permeability of the core 8 itself, providing the weight 5 is then taken as a constant standard, and in fact any other physical magnitude that can be converted into a force acting upon the beam to deflect it from equilibrium.

It has been found that this known electromagnetically compensated balance system has a number of shortcomings which limit its accuracy and sensitivity, and which can be summarized as follows:

First, it is necessary for correct operation of the system that with a given variation in weight on the pan 5 there will correspond always the same variation in current through the winding 11. This implies that the axial field in solenoid 11 must have a substantial constant axial gradient, i.e. will vary substantially linearly in the vertical direction. Hence, the solenoid 11 must be formed with an axially varying cross sectional configuration, as indicated by the tapered form shown in FIG. 1, but even then strict linearity is difficult to attain.

Moreover, the beam displacements, which are responsible for the variations in the compensating current signal, should be substantially astatic, i.e. the beam should have substantially indifferent equilibrium throughout its range of angular positions. Only if this condition is fulfilled will it be possible to state with certainty that the only force acting on the core 8 is the magnetic force and is a true function of the signal being measured independently of the gain in the electronic circuitry.

A further difficulty arises from the fact that the compensating electric signal, depending on the axial or vertical position of the magnetic core 8, will reflect displacements not only of the balance beam 1 about its pivot, but also any inevitable oscillations of the rods 7 and 9. The swinging of these rods can be said to impart two additional and spurious degrees of freedom into the system. Such swinging is amplifier and tends to be sustained by the action of the feedback loop. As a result the compensating signal tends to be ill-defined and spurious oscillations appear on the recorded graph of voltage taken across the resistor 16, so that the true variations of the magnitude being investigated are masked.

The signal from the photo-cell 13 is passed through an amplifier 14 associated with a damping filter 15 as shown in FIG. 2 prior to being applied to the solenoid winding 11 and measuring resistor 16. But the damping filter 15 cannot in practice be made selective to the natural mechanical frequency of the balance beam 1 sufficiently to damp out entirely the swinging of the beam. As already noted, the rods 7 and 9, as well as rod 4, also have natural swinging frequencies which differ widely from the frequency of the beam, and the filter cannot be made to damp out all these frequencies simultaneously.

Specific objects of this invention when applied to a precision measuring system of the type just described, are to eliminate the difficulties just listed and thereby enhance greatly the performance of the system, permitting more sensitive and accurate measurement. Broader objects are to eliminate comparable deficiencies that are present in electrically-operated re-positioning systems as this expression has been defined earlier in the specification.

In accordance with one feature of the present invention, more specifically applicable to the form of precision balance described, instead of using a mask 10 suspended from the balance beam, there is provided a mirror secured directly to the beam preferably at its center, arranged to reflect the light from a fixed source on to a fixed photo-electric cell so that the illumination of the cell will vary in response to the deflections of the beam. In accordance with a further feature, preferably applied concurrently with the first feature but susceptible of broader application, there is provided a first electrical network for modifying the electric signal (such as that produced by the photo-electric cell) prior to its application to the electric motive means (such as the solenoid), and there is provided a second electric network for modifying the signal from the first network prior to application to the output device (such as the measuring resistor), both said networks being so designed that their transfer functions are reciprocal the one of the other, so as to provide an over-all transfer function of unity. Specifically, the first network (assimilable to a high-gain phase-advance network) is made to have a transfer function of the form $(1+\alpha p)$, wherein $p$ is the complex variable in the Laplace transform $$f(p) = \int_0^\infty F(t) \cdot e^{-pt} \cdot dt$$

and $\alpha$ is a constant coefficient, and the second network is made to have a transfer function of the form $1/(1+\alpha p)$ wherein $\alpha$ has the same value as in the first network. Preferably common control means are provided for jointly adjusting the coefficient $\alpha$ in both networks.

With the improvements thus provided by the invention, all spurious oscillations occurring in prior electric re-positioning servo-systems of the contemplated type are eliminated. Owing to the fact that the mirror is secured directly to the beam, oscillations of the rods such as 7 and 9 in the example shown in FIG. 1 are eliminated since the optical means—the mirror—detecting the beam deflections is bodily movable with the beam. Further, the improved electronic feedback chain provided by the two correlated networks is absolutely stable in the sense that in addition to the absence of spurious oscillations liable to arise between the beam (or other movable member) and the signal-generating means as just indicated, there is no coupling of oscillations through either the electric or mechanical portions of the servo-system, and hence, the resulting record obtained from the variations of the electric signal is perfectly clear and definite under all conditions.

The stable character of the beam displacements, a result of the very high amplifying gain that can be imparted to the first network, greatly facilitates operation with such a system, since all measuring operations are practically performed with the beam in an angular position which does not vary once assumed for each measurement. No astatic adjustment of the beam is now necessary as was previously required in order to ensure that the only compensating force acting on the beam is the magnetic field from the solenoid, as explained above. For the same reason, it is now unnecessary for the solenoid to have a constant axial field gradient, and an ordinary cylindrical coil can be used.

Due to the reciprocal relationship between the transfer functions of the two electrical networks having a total transfer function equal to unity, the output factor of the system is a faithful replica of the input factor and the system successfully stabilizes the movable member by using a current signal which does not influence the instrument showing the variations in the current in the solenoid.

The invention will now be described in detail with reference to FIGS. 3 to 5 of the drawings in which the invention is shown applied to an electromagnetically compensated precision weighing system similar in character to the system described above with reference to FIGS. 1 and 2.

FIG. 3 is a schematic representation of an improved electromagnetically compensated balance system according to the invention;

FIG. 4 shows a detail of the optics used; and

Figure 1:
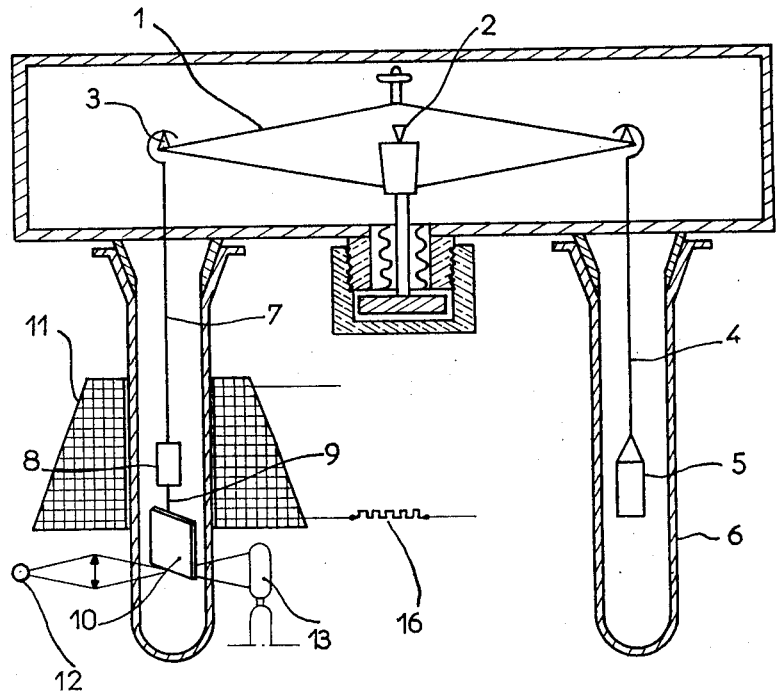
Figure 2:
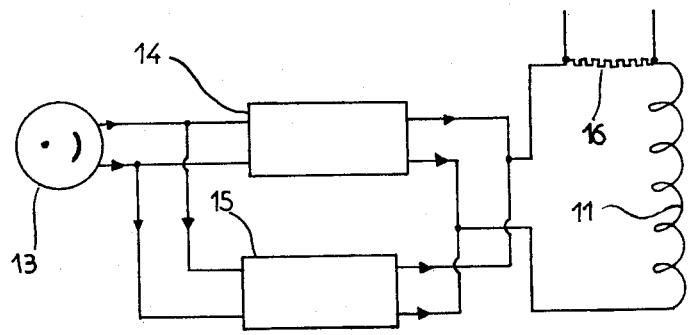

The precision balance shown in FIG. 3 is generally similar in construction to that described above in connection with FIG. 3 and will not again be described in detail. It will be noted that the solenoid coil 11 is here shown of an ordinary cylindrical shape rather than the tapered form shown in FIG. 1. This is because it is unnecessary, owing to the provisions of the invention, to have a linear gradient of magnetic field within the coil, so that the simpler type of coil shown can satisfactorily be used. The light beam 17 from source 12 is reflected from a mirror 18 which, in accordance with the invention, is fixedly secured to the balance beam 1 preferably in the vertical plane of the central knife-edge 2, and the reflected light strikes the photo-cell 13. The output from the cell is passed through a pre-amplifier 19 in which the impedance of the cell output is matched with the input impedance of the high-gain amplifier 14.

Negative feedback for the high-gain amplifier 14 is provided in the form of a frequency-selective filter 20 serving to damp out the oscillations of the balance. In accordance with the invention, the amplifier with its associated feedback loop has an over-all transfer function of the form $(1+\alpha p)$ wherein $\alpha$ is the damping constant. In practice the damping coefficient $\alpha$ is preferably made adjustable and is so adjusted that the amplifier circuit will yield an output response rising with frequency at a rate of about 20 db per decade, from a predetermined variable lower frequency limit or cut-off frequency of $$\frac{1}{2\pi\alpha}$$

up to an upper limiting frequency spaced therefrom by a frequency range corresponding to 8 octaves. If the cut-off frequency value $$\frac{1}{2\pi\alpha}$$

is selected so as to approach the natural mechanical frequency of the balance beam, is is found that an excellent damping characteristic results and that the beam promptly attains its equilibrium position.

The output from amplifier 14 is applied to the solenoid 11 and thence to a calibrated resistance 16 to ground. The strength of the current signal is measured as the voltage across resistance 16 through an output filter 21 and indicator or recorder instrument 22 of any conventional form. According to the invention, the filter 21 is provided as a phase lag network of 20 db per decade or the amplitude of the signal increases 20 db each time the frequency is multiplied by ten and its transfer function is $1/(1+\alpha p)$, the reciprocal of the transfer function of the circuit comprising amplifier 14 and filter 20. The cut-off frequency of filter 21 is $$\frac{1}{2\pi\alpha}$$

i.e. the same as that of the circuit 14—20, and a common adjusting control, not shown, is provided for jointly adjusting the lower cut-off frequencies of both filters 20 and 21. Thus it will be seen that the recording instrument 22, which has a very high input impedance, will accurately indicate and/or record the variations in the current through solenoid 11, free of the compensating signal component serving to stabilize the balance beam.

With reference to FIG. 4 a preferred embodiment of the optical system usable in accordance to the invention will be described. The light source indicated schematically at 12 in FIG. 3 is actually provided by an optical assembly including projection lamp 23, condenser lens 24, filter 25 arresting thermal radiations, diaphragm 26 and objective lens 27. The optics is preferably designed to yield a triangular beam. The photo-cell 13 is provided with a mask 28 having a narrow receiving slot 29. An apertured screen 30 is provided for arresting stray radiation. FIG. 4 further illustrates one half of the balance beam 1 with the mirror 18 secured to its centre on a level with the central knife-edge support 2.

Figure 5:
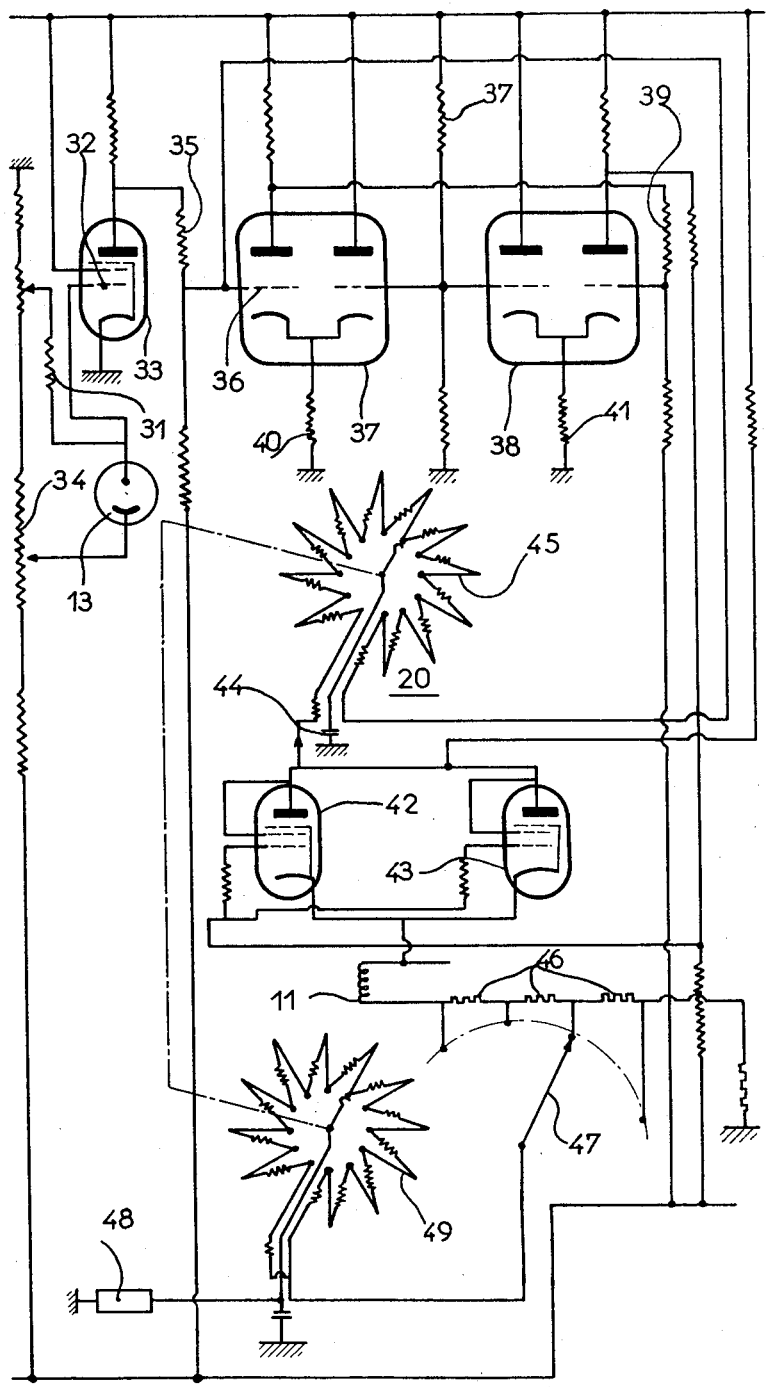
FIG. 5 is a circuit diagram of the electronic part of the same system.

FIG. 5 is a circuit diagram of a preferred form of embodiment of the pre-amplifier 19, amplifier 14 and feedback filter 20 shown as blocks in FIG. 3, and will only briefly be descriebd. Connected to the output of photocell 13 is a load resistor 31 which may have a resistance value of the order of 1 megohm. The voltage present across this load resistor is applied to the control grid 32 of a pentode tube 33, preferably type EF80 or equivalent having a steep characteristic. The resulting pre-amplifier stage has a voltage gain of about 80/1. The gain is adjustable by means of a potentiometer 34 and such adjustment permits compensation for variations in lighting and aging of the cell 13. The stage just described represents the pre-amplifier block 19 in FIG. 3. This is followed by the high-gain amplifier stage 14 which according to the invention is to have a transfer function of the form $(1+\alpha p)$ as already indicated, and which will now be described.

The plate output from the pentode 33 is applied through a conventional coupling resistance 35 of about 1 M$\omega$ to one control grid 36 of a double triode 37, e.g. type ECC-81, which constitutes the first stage of the high-gain amplifier proper. The second stage comprises a double triode 38 of similar type having its input grid supplied from the plate of triode 37 by way of resistance 39 of about 100,000 ohms. The resulting over-all gain in the two stages is about 400/1 in the instance described. It will be noted that the two apparently unused triode sections of the double triodes 37 and 38 serve as "guide" triodes, in that they prevent negative bias of the cathodes and practically cancel the negative feedback action of the two 7,800 ohms resistors 40 and 41.

The amplifier includes an output power stage comprising the pair of high-output pentodes 42 and 43, e.g. type EL–84, capable of yielding 60 milliamps output without excessive heating. The output pentodes serve to convert voltage variations of the cell 13 as amplified in stage 37—38, into current variations in the solenoid winding 11.

The damping filter network 20 is shown connected in a negative feedback loop to couple part of the output signal from pentodes 42 and 43 back to the input grid 36 of the input triode 37 of the amplifier. As shown, the filter essentially comprises a T network having one grounded capacitive branch 44 of 20 $\mu$f. capacitance, and a multi-tap potentiometer 45 comprising herein thirteen series-connected resistance sections representing a total resistance of 1 megohm. This potentiometer arrangement serves to adjust the damping constant $\alpha$ of amplifier 14.

The final output stage comprising pentodes 42 and 43 is connected as a cathode follower with the solenoid winding 11 connected in a series to the cathodes of the pentodes, in series with a sensitivity-adjusting network 46 comprising a series of high-precision, low temperature-coefficient resistances tapped to a potentiometer 47 whereby a suitable sensitivity value may be adjusted for the recording instrument 48.

Connected to the arm of potentiometer 47 is the indicating or recording circuit which comprises the output filter network 49 of similar construction to the damping filter network 45 and the high-input-impedance recording instrument 48. The potentiometer adjusting sliders of both filters 45 and 49 are ganged for operation from a common adjusting control so as to maintain the desired correspondence between the transfer functions of the circuits associated with both said networks as explained earlier.

By way of example, an improved balance system according to this invention, of a weighing capacity of up to 100 grammes upon the tray 5, is able to detect variations in weight on the order of $3.10^{-5}$ gramme.

As one example of the research work that can be done with such a balance system, it may be mentioned that an experimental unit was used to investigate the permeability variations of Mu Metal immersed in liquid nitrogen allowed to warm gradually. In this experiment the core 8 was made of Mu Metal and was immersed in the bath of liquid nitrogen. Means, not shown in FIG. 3, were provided for shielding the coil 11. With the load on tray 5 held constant, the variations in permeability of the Mu Metal were accurately plotted by the recording instrument 48.

What is claimed is:

1. In a precision measuring system comprising a balance beam movable about an equilibrium position by a force of variable magnitude to be measured, electromagnetic means including a solenoid for applying a force opposite to said first force to said beam tending to restore said beam to its equilibrium position in response to an electric signal applied to the solenoid, a light source, optical means connected with said beam, a photocell receiving variable illumination from said source by said optical means generating an electric signal responsive to beam displacement, a first electric signal modifying network receiving said photo-cell signal and applying a modified signal to said solenoid developing said second force, a second signal modifying network receiving said modified signal, an output device connected to said second signal modifying network receiving a second modified signal from said second signal modifying network and producing an output proportionate to the variation in the magnitude to be measured, said first signal modifying network having a transfer function $(1+\alpha p)$ and said second signal modifying network having a transfer function $1/(1+\alpha p)$ wherein $p$ is the complex variable in the Laplace transform and $\alpha$ is an adjustable constant having the same value in both said networks.

2. A precision measuring system comprising a balance beam movable about an equilibrium position in response to a force of variable magnitude to be measured, electromagnetic means including a solenoid for applying to said beam a second force opposite to said first force in response to an electric signal applied to said solenoid, a light source, a mirror fixed to the beam reflecting light from said source, a photo-cell arranged for variable illumination by the reflected light and generating a variable electric signal, a first electric signal modifying network receiving said photo-cell signal and applying a modified first signal to said solenoid to produce said second force tending to restore said beam to its equilibrium position, an output device, and a second electric signal-modifying network receiving said modified first signal from said first network and applying a modified second signal to said output device whereby said output device produces an output proportional to the variation in the magnitude to be measured, said electric networks having reciprocal transfer functions.

3. A precision measuring servo-system comprising a balance beam movable about an equilibrium position by a first force produced in response to a variable magnitude, electromagnetic means including a solenoid applying to said beam a second force opposite to said first force in response to an electric signal applied to said solenoid, a light source, a mirror fixed to said beam reflecting light from said source, a photo-cell receiving variable illumination from said reflected light and generating a corresponding electric signal, a first signal modifying network receiving said photo-cell signal and applying a modified first signal to said solenoid producing said second force tending to restore said beam to its equilibrium position, an output device, and a second signal modifying network receiving said modified first signal from said first network and applying a second modified signal to said output device producing an output proportionate to the variation in the magnitude to be measured, said first network including an amplifier and a filter and said second network including a filter having similar filter characteristics to those of said first filter, said networks having reciprocal transfer functions.

4. A system as described in claim 3 wherein said first network has a transfer function $(1+\alpha p)$ and said second network has a transfer function $1/(1+\alpha p)$ where $p$ is the complex variable in the Laplace transform and $\alpha$ is an adjustable coefficient, common to both of said networks.

5. A system as described in claim 3 including common adjusting means connected to said networks for jointly adjusting the filter characteristics of said networks to a common selected value.

6. A system as described in claim 3 including a calibrated resistance connected in parallel across said second network and said output device.

7. In a servo-system responsive to a variable condition and comprising a member displaceable from a balanced position in response to a change in said condition, means responsive to displacement of said member for producing an electric signal, electric means receiving said signal and exerting a force on said member to move said member toward its balanced position, a first electric network connected between said signal producing means and said electric means modifying said signal in accordance with transfer function $(1+\alpha p)$, output means, and a second electric network connected between said first network and said output means further modifying said modified signal in accordance with transfer function $1/(1+\alpha p)$ wherein $p$ is the complex variable in the Laplace transform, and $\alpha$ is a constant coefficient common to said networks.

8. In a servo-system responsive to a variable condition and comprising a member displaceable from a balanced position in response to a change in said condition, means responsive to displacement of said member producing an electric signal corresponding to the displacement thereof, electromotive means receiving said signal and exerting a force on said member toward balanced position, a first electric network including an amplifier, a negative feedback loop in said amplifier and a filter in said loop, said network being connected between said signal producing means and said motive means modifying said signal in accordance with transfer function $(1+\alpha p)$, output means, a second electric network including a filter connected between said first network and said output means further modifying said modified signal in accordance with transfer function $1/(1+\alpha p)$ wherein $p$ is a complex variable in the Laplace transform and $\alpha$ is a filter constant common to said filters of said networks, and common filter control means for jointly adjusting the filter constants of said filters to a selected value.

9. In a servo-system responsive to a variable condition and comprising a member displaceable from a balance position in response to a change in said condition, means responsive to the displacement of said member for producing an electric signal corresponding to the displacement, electromotive means receiving said signal and exerting a force on said member toward its balanced position, a first electric network including an amplifier, a negative feedback loop and a filter therein, said network being connected between said signal generating means and said motive means, output means, a second electric network including a filter connected between said first network and said output means, said filters in said networks having a common adjustable cut-off frequency, and said networks having transfer functions that are reciprocal with an over-all transfer function of unity.

References Cited in the file of this patent

UNITED STATES PATENTS

| | | |
|---|---|---|
| 2,631,027 | Payne | Mar. 10, 1953 |
| 2,657,276 | Eliot | Oct. 27, 1953 |
| 2,689,161 | Marchand | Sept. 14, 1954 |
| 2,734,735 | Payne | Feb. 14, 1956 |
| 2,734,736 | Payne | Feb. 14, 1956 |
| 2,914,310 | Bahrs | Nov. 24, 1959 |

OTHER REFERENCES

Review of Scientific Instruments, page 555, July 1953.
Electrical Manufact., pages 166, 168, October 1953.
The Review of Scientific Instruments, pages 1135–1138, December 1958.